(12) United States Patent
Åhman

(10) Patent No.: US 8,758,712 B2
(45) Date of Patent: Jun. 24, 2014

(54) WET SCRUBBER FOR REMOVING SULFUR DIOXIDE FROM A PROCESS GAS

(75) Inventor: Stefan O. H. Åhman, Vaxjo (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/988,519

(22) PCT Filed: Nov. 10, 2011

(86) PCT No.: PCT/IB2011/002682
§ 371 (c)(1),
(2), (4) Date: Aug. 9, 2013

(87) PCT Pub. No.: WO2012/069900
PCT Pub. Date: May 31, 2012

(65) Prior Publication Data
US 2014/0050645 A1   Feb. 20, 2014

(30) Foreign Application Priority Data
Nov. 25, 2010   (EP) .................................... 10192576

(51) Int. Cl.
*B01D 53/50* (2006.01)
*B01D 53/74* (2006.01)
*B01D 53/78* (2006.01)
*B01D 53/79* (2006.01)
*B01D 53/96* (2006.01)
*B01D 53/14* (2006.01)

(52) U.S. Cl.
CPC ........ *B01D 53/507* (2013.01); *B01D 2251/102* (2013.01); *B01D 2251/402* (2013.01); *B01D 2256/22* (2013.01); *B01D 53/96* (2013.01); *B01D 53/502* (2013.01); *B01D 2251/404* (2013.01); *B01D 53/1481* (2013.01)

USPC ........... 423/243.01; 423/243.08; 423/243.09; 423/243.11; 423/243.12; 422/168; 422/187; 422/608; 422/611

(58) Field of Classification Search
USPC ............. 423/243.01, 243.08, 243.09, 243.11, 423/243.12; 422/168, 187, 608, 611
See application file for complete search history.

(56) References Cited

U.S. PATENT DOCUMENTS

| 3,873,532 A | 3/1975 | Dahlstrom et al. |
| 3,883,639 A | 5/1975 | Cronkright, Jr. et al. |

(Continued)

FOREIGN PATENT DOCUMENTS

| JP | 55-24542 A | * 2/1980 | ............... 423/243.11 |
| JP | 61-35828 A | * 2/1986 | ............... 423/243.08 |
| WO | 9429003 A1 | 12/1994 | |

OTHER PUBLICATIONS

European Search Report, European Searching Authority, EP Application No. 10192576, Munich, Mar. 21, 2011.

(Continued)

*Primary Examiner* — Timothy Vanoy

(57) ABSTRACT

A wet scrubber (8) for cleaning a process gas containing sulphur dioxide comprises an absorption vessel (40) operative for bringing the process gas into contact with an absorption liquid to absorb sulphur dioxide from the process gas. The wet scrubber (8) further comprises an acidification system (90) operative for mixing absorption liquid that has absorbed sulphur dioxide from the process gas with a carbon dioxide containing gas, an absorbent dissolution tank (54) operative for adding an absorbent material to at least a portion of the absorption liquid, and a return pipe (104) operative for returning to the absorption vessel (40) at least a portion of the absorption liquid that has been mixed with the carbon dioxide containing gas.

19 Claims, 2 Drawing Sheets

(56) References Cited

U.S. PATENT DOCUMENTS

| | | |
|---|---|---|
| 4,272,498 A | 6/1981 | Faatz |
| 4,452,766 A | 6/1984 | Pike |
| 5,505,766 A | 4/1996 | Chang |
| 7,906,086 B2 * | 3/2011 | Comrie .................. 423/210 |

OTHER PUBLICATIONS

International Search Report and Written Opinion, PCT Application No. PCT/IB2011/002682, Feb. 9, 2012.

* cited by examiner

WET SCRUBBER FOR REMOVING SULFUR DIOXIDE FROM A PROCESS GAS

FIELD OF THE INVENTION

The present invention relates to a method of cleaning a process gas containing sulphur dioxide by means of a wet scrubber.

The present invention also relates to a wet scrubber for cleaning a process gas containing sulphur dioxide, the wet scrubber comprising an absorption vessel operative for bringing the process gas into contact with an absorption liquid to absorb sulphur dioxide from the process gas.

BACKGROUND OF THE INVENTION

In the combustion of a fuel, such as coal, oil, peat, waste, etc., in a combustion plant, such as a power plant, a hot process gas is generated, such process gas containing, among other components, carbon dioxide $CO_2$. With increasing environmental demands various processes have been developed for removing carbon dioxide from the process gas. One such process is the so called oxy-fuel process, an example of which is disclosed in US 2007/0243119. In an oxy-fuel process a fuel, such as one of the fuels mentioned above, is combusted in the presence of a nitrogen-lean gas. Oxygen gas, which is provided by an oxygen source, is supplied to a boiler in which the oxygen gas oxidizes the fuel. In the oxy-fuel combustion process a carbon dioxide rich flue gas is produced, the carbon dioxide content of which can be compressed in a separate unit and be disposed of in order to reduce the emission of carbon dioxide into the atmosphere.

The carbon dioxide, $CO_2$, generated in an oxy-fuel process is normally compressed to a high pressure, or even liquefied, prior to being disposed of. The compression of the carbon dioxide is associated with stringent requirements for low concentrations of impurities. One such impurity is sulphur dioxide, which is generated when sulphur containing compounds of the fuel are oxidized during the combustion process. WO 2009/052775 discloses a wet scrubber that may be utilized for removing sulphur dioxide from a process gas generated in an oxy-fuel combustion process. The wet scrubber of WO 2009/052775 may in some situations not be efficient enough with respect to the required sulphur dioxide removal efficiency.

SUMMARY OF THE INVENTION

The above drawbacks and deficiencies of the prior art are overcome or alleviated by means of a method of cleaning a process gas containing sulphur dioxide by means of a wet scrubber, said method comprising bringing the process gas into contact with an absorption liquid in an absorption vessel to absorb sulphur dioxide from the process gas, mixing the absorption liquid with a carbon dioxide containing gas comprising at least 20% by volume carbon dioxide, adding an absorbent material to at least a portion of the absorption liquid, and returning at least a portion of the absorption liquid to the absorption vessel to absorb more sulphur dioxide from the process gas.

An advantage of this method is that the removal of sulphur dioxide is increased. This effect may be attributable to the carbon dioxide containing gas being added to the absorption liquid, the added carbon dioxide being believed to increase the sulphur dioxide removal capacity of the absorption liquid.

According to one embodiment the step of mixing the absorption liquid with a carbon dioxide containing gas comprising at least 20% by volume carbon dioxide is carried out simultaneously with the step of adding an absorbent material to at least a portion of the absorption liquid. An advantage of this embodiment is that an increased amount of absorbent material may be dissolved in the absorption liquid, making the absorption liquid more efficient for removing sulphur dioxide from the process gas.

According to one embodiment the method further comprises mixing the absorption liquid with an oxygen containing gas containing at least 3% by volume oxygen, $O_2$, prior to mixing the absorption liquid with the carbon dioxide containing gas comprising at least 20% by volume carbon dioxide. An advantage of this embodiment is that oxidation of captured sulphur species to a suitable rest product, such as gypsum, may be performed prior to adding the gaseous carbon dioxide. This reduces the risk that any weakly bound sulphur species, such as sulphite ions, are decomposed to form gaseous sulphur dioxide under the influence of the added carbon dioxide.

According to one embodiment the step of mixing the absorption liquid with an oxygen containing gas containing at least 3% by volume oxygen, $O_2$, is performed in an oxidation tank from which the absorption liquid is transferred to an absorbent dissolution tank in which the step of mixing the absorption liquid with a carbon dioxide containing gas comprising at least 20% by volume carbon dioxide is carried out. An advantage of this embodiment is that mixing the absorption liquid with the oxygen containing gas and with the carbon dioxide containing gas in separate tanks reduces the risk of unwanted side effects, such as decomposition of dissolved sulphur species into gaseous sulphur dioxide and/or decomposition, induced by oxygen containing gas, of dissolved carbonate species into gaseous carbon dioxide.

According to one embodiment a first portion of the absorbent material is added to the absorbent dissolution tank, and a second portion of the absorbent material is added to the absorption liquid after the absorption liquid has left the absorbent dissolution tank. An advantage of this embodiment is that the dissolution of absorbent material in the absorbent dissolution tank can be carried out at a pH which is optimal for such dissolution to be efficient, while the pH may subsequently be altered by means of the second portion of the absorbent material, to a level which is optimal for the removal of sulphur dioxide in the absorption vessel.

According to one embodiment the carbon dioxide containing gas comprising at least 20% by volume carbon dioxide at least partly originates from process gas that is to be cleaned, or has already been cleaned, in the wet scrubber. An advantage of this embodiment is that the operating cost is reduced, since the process gas is available in large amounts at a very low cost. Hence, it will not be necessary to purchase the carbon dioxide containing gas that is to be mixed with the absorption liquid.

According to one embodiment at least a portion of the carbon dioxide containing gas comprising at least 20% by volume carbon dioxide is generated in an oxy-fuel boiler. An oxy-fuel boiler generates a large amount of carbon dioxide containing process gas containing a high percentage of carbon dioxide gas. Hence, a process gas generated in an oxy-fuel boiler is highly suitable for being mixed with the absorption liquid, and is available at a low, or no, cost.

The above drawbacks and deficiencies of the prior art are also overcome or alleviated by means of a wet scrubber for cleaning a process gas containing sulphur dioxide, the wet scrubber comprising an absorption vessel operative for bringing the process gas into contact with an absorption liquid to absorb sulphur dioxide from the process gas, the wet scrubber further comprising an acidification system operative for mixing absorption liquid that has absorbed sulphur dioxide from the process gas with a carbon dioxide containing gas, an absorbent dissolution tank operative for adding an absorbent material to at least a portion of the absorption liquid, and a return pipe operative for returning to the absorption vessel at least a portion of the absorption liquid that has been mixed with the carbon dioxide containing gas, and to which absorption liquid the absorbent material has been added, to absorb more sulphur dioxide from the process gas.

An advantage of this wet scrubber is that it is more efficient in removing sulphur dioxide compared to wet scrubbers of the prior art having the similar types and designs of absorption vessels.

According to one embodiment the acidification system operative for mixing absorption liquid that has absorbed sulphur dioxide from the process gas with a carbon dioxide containing gas is arranged in the absorbent dissolution tank operative for adding an absorbent material to at least a portion of the absorption liquid, such that mixing the absorbent liquid with carbon dioxide containing gas may be performed simultaneously with adding absorbent material to the absorption liquid. An advantage of this embodiment is that dissolution of absorbent material becomes very efficient, and that investment costs are limited, since one and the same tank is utilized both for the mixing of the absorption liquid with the carbon dioxide and for adding the absorbent material to the absorption liquid.

According to one embodiment the wet scrubber comprises a first absorbent supply pipe which is operative for supplying a first portion of the absorbent material to the absorbent dissolution tank, and a further absorbent supply pipe which is operative for supplying a second portion of the absorbent material to the absorption liquid in a position located downstream of the absorbent dissolution tank. An advantage of this embodiment is that dissolution of the absorbent material can be accomplished at the optimal pH value, while the pH of the absorption liquid entering the absorption vessel can be set to another value, which is optimal for the absorption of sulphur dioxide from the process gas.

According to one embodiment the wet scrubber comprises an oxidation tank, which is separate from a tank in which the acidification system is arranged, and which is operative for mixing absorption liquid that has absorbed sulphur dioxide from the process gas with an oxygen containing gas, the oxidation tank being located upstream of the tank in which the acidification system is arranged as seen with respect to the flow direction of the absorption liquid. An advantage of this embodiment is that the oxidation and the acidification processes are carried out in an efficient manner with limited unwanted side effects, such as decomposition of dissolved sulphur species into gaseous sulphur dioxide, or decomposition of dissolved carbonate species into gaseous carbon dioxide.

According to one embodiment a gas duct is arranged upstream or downstream of the absorption vessel for transporting a portion of the process gas to the acidification system, such that said portion of the process gas will form the carbon dioxide containing gas. An advantage of this embodiment is that the complexity and operating cost of the wet scrubber are reduced, since a process internal gas is utilized as the carbon dioxide containing gas.

According to one embodiment the wet scrubber comprises a first gas transporting device which is operative for transporting an oxygen containing gas from a first source of gas to an oxidation tank operative for mixing the oxygen containing gas with the absorption liquid, and a second gas transporting device which is operative for transporting a carbon dioxide containing gas from a second source of gas to the acidification system operative for mixing the carbon dioxide containing gas with the absorption liquid, the first source of gas being different from the second source of gas. An advantage of this embodiment is that using two different sources of gas increases the possibilities of individually optimizing the respective oxidation and acidification processes.

Further objects and features of the present invention will be apparent from the following detailed description and claims.

BRIEF DESCRIPTION OF THE DRAWINGS

The invention is described in more detail below with reference to the appended drawings in which.

DESCRIPTION OF PREFERRED EMBODIMENTS

Figure 1:
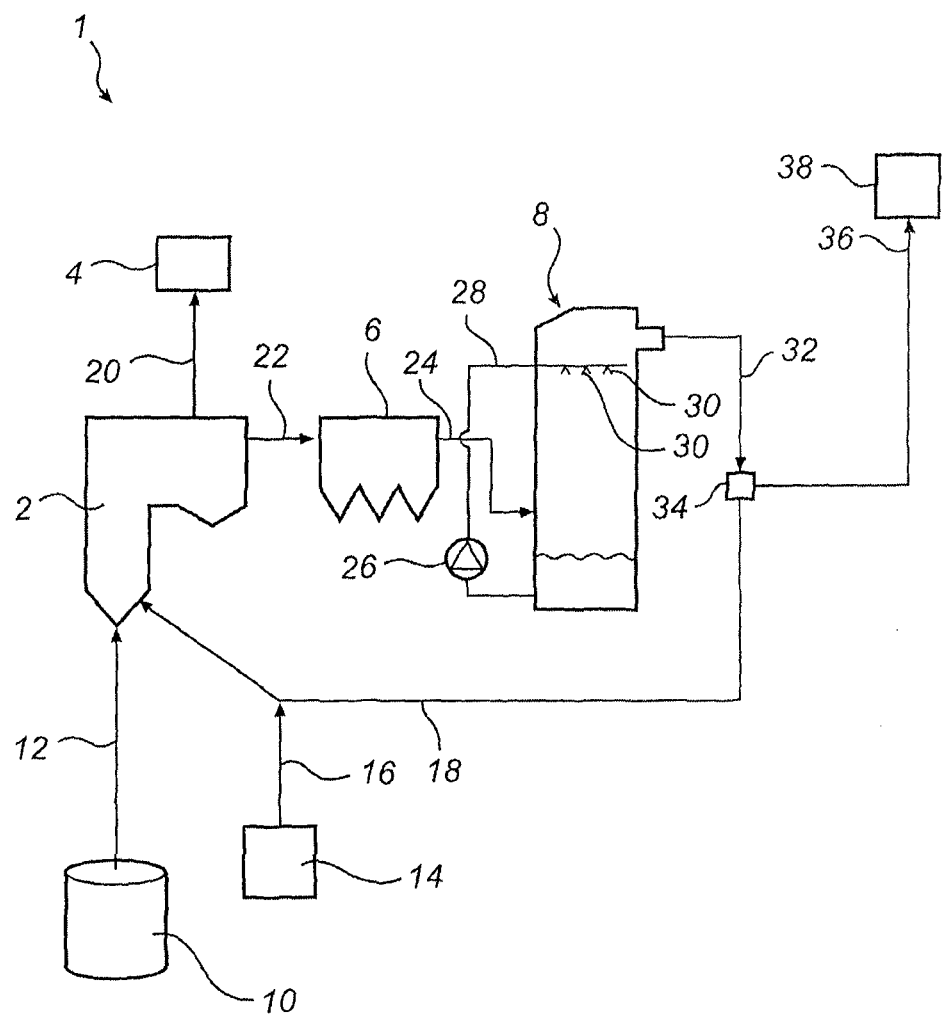
FIG. 1 is a schematic side view of a boiler system comprising a wet scrubber.

FIG. 1 is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, a particulate removal device in the form of an electrostatic precipitator 6, and a sulphur dioxide removal device in the form of a wet scrubber 8, which will be described in more detail hereinafter with reference to FIG. 2.

Returning to FIG. 1, a fuel, such as coal, oil, or peat, is contained in a fuel storage 10, and can be supplied to the boiler 2 via a supply pipe 12. An oxygen gas source 14 is operative for providing oxygen gas in a manner which is known per se. The oxygen gas source 14 may be an air separation plant operative for separating oxygen gas from air, an oxygen separating membrane, a storage tank, or any other source for providing oxygen gas to the system 1. A supply duct 16 is operative for forwarding the produced oxygen gas, comprising typically 90-99.9 vol. % oxygen, $O_2$, to the boiler 2. A duct 18 is operative for forwarding recirculated flue gas, which contains carbon dioxide, to the boiler 2. As indicated in FIG. 1 the supply duct 16 joins the duct 18 upstream of the boiler 2, such that oxygen gas and recirculated flue gas, which contains carbon dioxide, may become mixed with each other to form a gas mixture containing typically about 20-50% by volume of oxygen gas, the balance being mainly carbon dioxide and water vapour, upstream of the boiler 2. Since almost no air enters the boiler 2 there is almost no nitrogen gas supplied to the boiler 2. In practical operation, less than 3 vol. % of the gas volume supplied to the boiler 2 is air, which mainly enters the boiler 2 as a leakage of air. The boiler 2 is operative for combusting the fuel, that is to be supplied via the supply pipe 12, in the presence of the oxygen gas, mixed with the recirculated flue gas, which contains carbon dioxide, that is to be supplied via the duct 18. A steam pipe 20 is operative for forwarding steam, that will be produced in the boiler 2 as a result of the combustion, to the steam turbine electric power generation system 4, which is operative for generating power in the form of electric power.

A duct 22 is operative for forwarding carbon dioxide rich flue gas generated in the boiler 2 to the electrostatic precipitator 6. By "carbon dioxide rich flue gas" is meant that the flue gas leaving the boiler 2 via the duct 22 will contain at least 40% by volume of carbon dioxide, $CO_2$. Often more than 50% by volume of the flue gas leaving the boiler 2 will be carbon dioxide. The balance of the "carbon dioxide rich flue gas" will be about 20-50% by volume of water vapour ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The electrostatic precipitator 6, which may be of a type which is per se known from, for example, U.S. Pat. No. 4,502,872, removes most of the dust particles from the carbon dioxide rich flue gas. As alternative to an electrostatic precipitator a fabric filter, which is per se known from, for example, U.S. Pat. No. 4,336,035, may be utilized for removing the dust particles. A duct 24 is operative for forwarding the carbon dioxide rich flue gas from the electrostatic precipitator 6 to the wet scrubber 8.

The wet scrubber 8 is of the tower scrubber type, a scrubber type which is per se known from, for example, EP 0 162 536. The wet scrubber 8, which is operative for removing most of the sulphur dioxide content of the carbon dioxide rich flue gas coming from the boiler 2 via the electrostatic precipitator 6, comprises a circulation pump 26 which is operative for circulating, in an absorption liquid circulation pipe 28, an absorption liquid in the wet scrubber 8 to a set of nozzles 30. The nozzles 30 are operative for atomizing the absorption liquid in the wet scrubber 8 and to achieve good contact between the absorption liquid and the flue gas being forwarded to the wet scrubber 8 via the duct 24 and flowing substantially vertically upwards inside the wet scrubber 8. The manner in which the absorption liquid is prepared and treated will be described in more detail hereinafter with reference to FIG. 2.

As alternative to the wet scrubber 8 of the tower type other types of wet scrubbers may be utilized for removing sulphur dioxide from the carbon dioxide rich flue gas. One such alternative device is a bubbling bed scrubber, an example of which is disclosed in WO 2005/007274. The bubbling bed scrubber comprises an absorption vessel in the form of a perforated plate carrying on its upper side a layer of an absorption liquid through which layer the process gas is bubbled.

Returning to FIG. 1, the carbon dioxide rich flue gas from which most, if not all, of the sulphur dioxide has been removed leaves the wet scrubber 8 via a duct 32 which forwards the flue gas to a gas distribution point 34. At the gas distribution point 34, the carbon dioxide rich flue gas is divided into two flows, namely a first flow, which via the duct 18 is recirculated back to the boiler 2, and a second flow, which via a duct 36 is forwarded to a gas compression and purification unit 38 in which the carbon dioxide rich flue gas is compressed for final disposal, which is sometimes referred to as $CO_2$ sequestration. The first flow, which is recirculated back to the boiler 2, typically comprises 50-90% by volume of the total flow of the carbon dioxide rich flue gas leaving the wet scrubber 8.

Figure 2:
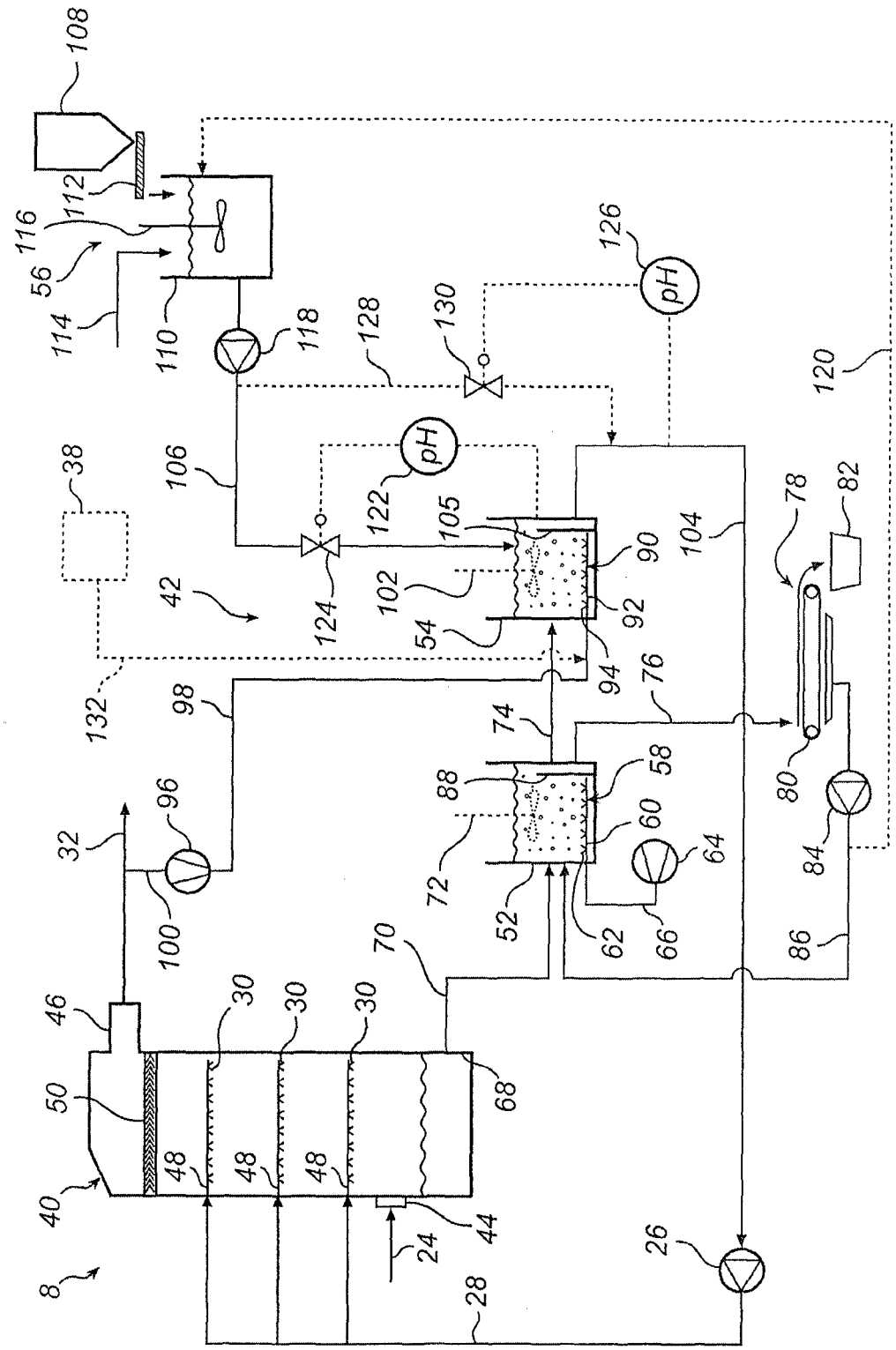
FIG. 2 is an enlarged schematic side view of the wet scrubber of FIG. 1.

FIG. 2 illustrates the wet scrubber 8 in more detail. As already described hereinbefore with reference to FIG. 1, the carbon dioxide rich flue gas is transported to the wet scrubber 8 via the duct 24. The wet scrubber 8 comprises, as its main components, an absorption vessel in the form of an open wet scrubber tower 40 and an absorption liquid treatment system 42. The open wet scrubber tower 40 is provided with a gas inlet 44, which is located at a lower portion of the wet scrubber tower 40, and a gas outlet 46, which is located at an upper portion of the wet scrubber tower 40. The absorption liquid circulation pipe 28 is fluidly connected to a number of tubular portions 48, each such tubular portion comprising a number of fluidly connected atomizing nozzles 30. The carbon dioxide rich flue gas enters the wet scrubber tower 40 at the inlet 44 and is conveyed vertically upwards through the wet scrubber tower 40, being brought into intensive contact with the absorption liquid atomized by nozzles 30.

A mist eliminator 50 is located above the tubular portions 48 and nozzles 30. The mist eliminator 50, being located adjacent to the gas outlet 46, removes at least a portion of the absorption liquid droplets entrained by the flue gas being conveyed vertically upwards through the wet scrubber tower 40, before the cleaned flue gas is allowed to leave the wet scrubber 8 via the outlet 46 and the duct 32.

The absorption liquid treatment system 42 comprises, as its main components, a first tank, being an oxidation tank 52, a second tank, being an absorbent dissolution tank 54, and an absorbent slurry preparation system 56.

The oxidation tank 52 is provided with an oxidation system 58 comprising a pipe 60 and a number of nozzles 62 that are fluidly connected to the pipe 60 and are arranged at the bottom of the oxidation tank 52. A first gas transporting device in the form of a blower 64 is, via a supply duct 66, fluidly connected to the pipe 60. The wet scrubber tower 40 has, at its lower end, a bottom tank 68 which collects the absorption liquid that has been atomized by the nozzles 30. A pipe 70 is fluidly connected to the bottom tank 68 and to the oxidation tank 52 and is operative for conveying absorption liquid from the bottom tank 68 to the oxidation tank 52.

The blower 64 is operative for blowing an oxygen containing gas to the oxidation system 58 from a first source of gas. The first source of gas may, for example, be the ambient air. The oxygen containing gas blown by the blower 64 to the oxidation system 58 preferably comprises at least 3% by volume oxygen, $O_2$, more preferably at least 5% by volume oxygen, and most preferably at least 10% by volume oxygen, and preferably less than 5% by volume carbon dioxide, $CO_2$, more preferably less than 1% by volume carbon dioxide. A typical oxygen containing gas could comprise 10-100% by volume oxygen, 0-1% by volume carbon dioxide, and totally 0-90% by volume of other gases, including for example nitrogen, $N_2$, water vapour, $H_2O$, and argon, Ar. The blower 64 may, for example, blow ambient air, comprising about 21% by volume oxygen, and about 0.04% by volume carbon dioxide to the oxidation arrangement 58. Other gas mixtures are also possible, including, for example, almost pure oxygen gas, comprising for example 90-100% by volume oxygen, and various mixtures of oxygen gas and ambient air. The nozzles 62 distribute the oxygen containing gas supplied from the blower 64 in the absorption liquid contained in the oxidation tank 52.

The oxidation tank 52 may be provided with an agitator 72, which is useful for improving the contact between the absorption liquid and the oxygen containing gas. A pipe 74 is fluidly connected to the oxidation tank 52 and is operative for conveying absorption liquid from the oxidation tank 52 to the absorbent dissolution tank 54. A further pipe 76 is fluidly connected to the oxidation tank 52 and is operative for conveying absorption liquid from the oxidation tank 52 to a dewatering unit 78. In the dewatering unit 78 a filtering device, such as a belt filter 80, is utilized for separating a solid rest product, such as gypsum, from the absorption liquid, hence forming a solid rest product, and a more or less clear liquid. The solid rest product is separated from the liquid on the belt filter 80, and is collected in a rest product bin 82. The more or less clear liquid is pumped, by means of a pump 84 and via a fluidly connected pipe 86, back to the oxidation tank 52.

A vertical wall 88 may extend from the bottom of the oxidation tank 52 and almost up to the surface of the absorption liquid in the tank 52. The vertical wall 88 separates the oxidation system 58 from the position where the pipes 74, 76 are connected to the tank 52 and reduces the amount of gas bubbles leaving the tank 52 with the absorption liquid.

The absorbent dissolution tank 54 is provided with an acidification system 90 comprising a pipe 92 and a number of nozzles 94 that are fluidly connected to the pipe 92 and are arranged at the bottom of the absorbent dissolution tank 54. The nozzles 94 may, for example, comprise a plurality of circular openings, each having a diameter 2-20 mm and being formed in the wall of pipe 92. A second gas transporting device in the form of a blower 96 is, via a supply duct 98, fluidly connected to the pipe 92. The blower 96 is operative for blowing a carbon dioxide containing gas comprising at least 20% by volume carbon dioxide, $CO_2$, to the acidification system 90. The carbon dioxide containing gas blown by the blower 96 to the acidification system 90 preferably comprises at least 30% by volume carbon dioxide, and more preferably at least 50% by volume carbon dioxide. A typical carbon dioxide containing gas could comprise 20-100% by volume carbon dioxide, 0-5% by volume oxygen, and totally 0-80% by volume of other gases, including for example nitrogen, $N_2$, water vapour, $H_2O$, and argon, Ar. In the embodiment depicted in FIG. 2, the blower 96 draws, via a fluidly connected duct 100, a carbon dioxide containing gas from a second source of gas, the second source of gas being in this embodiment the duct 32 via which the carbon dioxide rich flue gas from which most, if not all, of the sulphur dioxide has been removed leaves the wet scrubber 8. The carbon dioxide rich flue gas of the duct 32 has a carbon dioxide content of typically at least 40% by volume, often at least 50% by volume, and is available in large amounts. Since the carbon dioxide rich flue gas is a rest product, there is almost no cost for using it in the acidification system 90. The nozzles 94 distributes the carbon dioxide containing gas supplied from the blower 96 in the absorption liquid contained in the absorbent dissolution tank 54.

The absorbent dissolution tank 54 may be provided with an agitator 102, which is useful for improving the contact between the absorption liquid and the carbon dioxide containing gas. A return pipe 104 is fluidly connected to the absorbent dissolution tank 54. The circulation pump 26, which is operative for circulating, in the absorption liquid circulation pipe 28, the absorption liquid to the nozzles 30, is fluidly connected to the pipe 104 and conveys the absorption liquid from the absorbent dissolution tank 54 to the nozzles 30.

A vertical wall 105 may extend from the bottom of the tank 54 and almost up to the surface of the absorption liquid in the tank 54. The vertical wall 105 separates the acidification system 90 from the position where the pipe 104 is connected to the tank 54 and reduces the amount of gas bubbles leaving the tank 54 with the absorption liquid.

Absorbent slurry is supplied to the absorbent dissolution tank 54 from the absorbent slurry preparation system 56 via an absorbent supply pipe 106. The absorbent slurry preparation system 56 comprises an absorbent silo 108 which is operative for storing absorbent material in powder form, an absorbent slurry mixing tank 110, an absorbent feeder 112, which is utilized for feeding absorbent material from the silo 108 to the tank 110, a water pipe 114, which is utilized for feeding water, or a liquid containing at least some water, to the tank 110, and an agitator 116 which is utilized for mixing the absorbent material with the water in the tank 110 to form an absorbent slurry. An absorbent slurry pump 118 is utilized for transporting absorbent slurry from the tank 110 to the absorbent dissolution tank 54 via fluidly connected pipe 106. Optionally, the more or less clear liquid generated in dewatering unit 78 can be conveyed, via pump 84 and fluidly connected pipe 120, to the absorbent slurry mixing tank 110. The more or less clear liquid supplied via pipe 120 may reduce, or even eliminate, the need for water, or water containing liquid, supplied via pipe 114.

The amount of absorbent slurry supplied to the absorbent dissolution tank 54 can be controlled by measuring, by means of a first pH sensor 122, the pH of the absorption liquid in the dissolution tank 54. The pH measured by means of the pH sensor 122 is utilized for controlling a control valve 124 arranged on pipe 106 and being utilized for controlling the flow of absorbent slurry via the pipe 106. The pH measured by sensor 122 is compared to a pH set point, such set point indicating a suitable pH for a high degree of dissolution of absorbent material in the absorption liquid. When, for example, the pH measured by sensor 122 is lower than the pH set point, the valve 124 is opened to increase the flow of absorbent slurry to the dissolution tank 54 to increase the pH.

Optionally a second pH sensor 126 is arranged for measuring the pH of the absorption liquid conveyed in the pipe 104. A further absorbent supply pipe 128 may be fluidly connected to the pipe 106 and may be utilized for conveying absorbent slurry from the tank 110, via pump 118 and pipe 106, to pipe 104. The further absorbent supply pipe 128 is fluidly connected to the pipe 104 upstream of position of second pH sensor 126. The pH measured by means of the pH sensor 126 is utilized for controlling a control valve 130 arranged on pipe 128 and being utilized for controlling the flow of absorbent slurry via the pipe 128. The pH measured by sensor 126 is compared to a pH set point, such set point indicating a desired pH of the absorption liquid that is to be atomized by nozzles 30 in wet scrubber tower 40. When, for example, the pH measured by sensor 126 is lower than the pH set point, the valve 130 is opened to increase the flow of absorbent slurry to the pipe 104 to increase the pH. Typically, the pH set point of the absorption liquid of tank 54 is a pH of 5 to 6, wherein the pH set point of the absorption liquid of pipe 104 is typically about 0.1 to 0.5 pH units higher, i.e., the pH set point of absorption liquid in pipe 104 is typically a pH of 5.1 to 6.5. Hence, a first portion of the total amount of absorbent material supplied may be supplied to the absorbent dissolution tank 54 via the absorbent supply pipe 106, and a second portion of the total amount of absorbent material may be supplied to the return pipe 104 via the further absorbent supply pipe 128. In the embodiment illustrated in FIG. 2, the second portion of the absorbent material is fed into the return pipe 104 by means of the further absorbent supply pipe 128. It will be appreciated that mixing means, such as a static mixer, a separate mixing tank, etc., could be arranged on the return pipe 104 to further improve the mixing of absorption liquid and absorbent material.

Without being bound by any specific theory, it is believed that the reactions occurring in the various parts of the wet scrubber 8 may be the following:

The blower 96 supplies a carbon dioxide containing gas to the absorbent dissolution tank 54. As an effect of this, the carbon dioxide, $CO_2$, will react with water molecules, $H_2O$, of the absorption liquid of the absorbent dissolution tank 54:

$$CO_2 (g) + H_2O (l) \Longleftrightarrow HCO_3^- (aq) + H^+ (aq) \quad [eq. 1.1]$$

To the absorbent dissolution tank 54 a slurry of an absorbent material is supplied from the absorbent slurry preparation system 56. The absorbent material could comprise, for example, limestone, $CaCO_3$. The limestone may react with water molecules in a two step process:

$$CaCO_3 (s) \Longleftrightarrow Ca^{2+} (aq) + CO_3^{2-} (aq) \quad [eq. 1.2]$$

$$CO_3^{2-} (aq) + H_2O (l) \Longleftrightarrow HCO_3^- (aq) + OH^- (aq) \quad [eq. 1.3]$$

From the reactions indicated above it is clear that hydrogen ions, $H^+$, generated when carbon dioxide gas is dissolved in the absorption liquid [eq. 1.1] may react with, and be neutralized by, hydroxide ions, $OH^-$, generated when limestone is dissolved in the absorption liquid [eq. 1.2 and 1.3]. The product of such neutralization is water. This will tend to push the equilibrium of eq. 1.2 and 1.3 to the right, meaning that more limestone can be dissolved in the absorption liquid in the absorbent dissolution tank 54.

The absorption liquid is conveyed, via the pipes 104 and 28 to the wet scrubber tower 40 and is atomized by means of the nozzles 30. In the wet scrubber tower 40 the following reaction will occur upon absorption of sulphur dioxide, $SO_2$, comprised in the flue gas:

$$2SO_2 (g) + 2HCO_3^- (aq) + Ca^{2+} (aq) \Longleftrightarrow Ca(HSO_3)_2 (aq) + 2CO_2 (g) \quad [eq. 2.1]$$

Hence, it will be appreciated that the bicarbonate ions, $HCO_3^-$, generated in the absorbent dissolution tank 54 according to eq. 1.1, 1.2 and 1.3, will tend to push the equilibrium of eq. 2.1 to the right, meaning that sulphur dioxide is efficiently absorbed in the absorption liquid.

The absorption liquid is conveyed, via the pipe 70, to the oxidation tank 52. In the oxidation tank 52 the following reaction may occur:

$$Ca(HSO_3)_2 (aq) + O_2 (g) + Ca^{2+} (aq) + 2HCO_3^- (aq) \Longleftrightarrow 2CaSO_4 (s) + 2CO_2 (g) + 2H_2O \quad [eq. 3.1]$$

Hence, gypsum, $CaSO_4$, sometimes described as including two water molecules, i.e., $CaSO_4 \times 2H_2O$, is formed as the end product.

It can be seen from the above reactions that the reaction occurring according to eq. 1.1 by supplying carbon dioxide containing gas to the absorbent dissolution tank 54 is beneficial both in the dissolution of limestone in the absorbent dissolution tank 54 according to eq. 1.2 and 1.3, for the absorption of sulphur dioxide, $SO_2$, in the wet scrubber tower 40 according to eq. 2.1, and for the oxidation of the formed calcium bisulphite, $Ca(HSO_3)_2$, in the oxidation tank 52 according to eq. 3.1. For example, the equilibriums of equations 2.1 and 3.1 are pushed to the right by an increased concentration of the bicarbonate ion, $HCO_3^-$ (aq). Thus, the removal of sulphur dioxide is more efficient compared to the wet scrubbers of the prior art. Problems caused by sulphur dioxide in the gas compression and purification unit 38, depicted in FIG. 1, can be avoided, or at least alleviated.

It will be appreciated that numerous variants of the embodiments described above are possible within the scope of the appended claims.

Hereinbefore it has been described that limestone, $CaCO_3$, is used as absorbent material. It will be appreciated that other absorbent materials could also be utilized. Examples of such other materials include dolomite, $CaMg(CO_3)_2$, and other absorbent materials that are suitable for removal of sulphur dioxide.

Hereinbefore it has been described that the absorbent material, such as the limestone, is added to the absorption liquid in that same tank, namely the absorbent dissolution tank, in which the carbon dioxide containing gas is mixed with the absorption liquid. It will be appreciated that the carbon dioxide containing gas could be mixed with the absorption liquid in another, separate, tank, which could be arranged either upstream or downstream, with respect to the direction of travel of the absorption liquid, of that tank in which the absorbent material is added to the absorption liquid.

Hereinbefore it has been described that the carbon dioxide containing gas is drawn from the duct 32 in which the cleaned flue gas is transported from the wet scrubber 8. It will be appreciated that the carbon dioxide containing gas could also, as alternative, be drawn from the duct 24 supplying the dirty flue gas to the wet scrubber 8, or even from duct 22 in which the dirty flue gas is transported from the boiler 2 to the electrostatic precipitator 6. In the case of drawing carbon dioxide containing gas from any of the ducts 22, 24, or from another duct containing gas of a similar composition, including a high concentration of sulphur dioxide, it will be appreciated that an emission of sulphur dioxide from the absorbent dissolution tank 54 may occur, although a portion of the sulphur dioxide content of the carbon dioxide containing gas is likely to be absorbed by the absorption liquid through which the carbon dioxide containing gas is bubbled.

A further option is to draw carbon dioxide containing gas from the gas compression and purification unit 38. The gas compression and purification unit 38 compresses the carbon dioxide in several steps by means of compressors, and often also removes some water and other impurities from the carbon dioxide prior to $CO_2$ sequestration. Hence, in the gas compression and purification unit 38 carbon dioxide containing gases of various degrees of purity and pressures are available. A portion of such pressurized carbon dioxide could be forwarded from the gas compression and purification unit 38 to the acidification system 90 for use as a carbon dioxide containing gas that is distributed in the absorption liquid contained in the absorbent dissolution tank 54. A blower would often not be needed, since the gas coming from the gas compression and purification unit 38 is often pressurized. Hence, in accordance with this alternative embodiment a supply duct 132 could be fluidly connected to the gas compression and purification unit 38 and to the pipe 92 for supplying carbon dioxide containing gas directly from the gas compression and purification unit 38 to the acidification system 90. In accordance with a further alternative, a carbon dioxide containing gas may also be supplied to the acidification system 90 via supply duct 132 from another source, such as a carbon dioxide storage tank.

The boiler system 1 described with reference to FIG. 1 comprises an oxy-fuel boiler 2. It will be appreciated that the wet scrubber 8, and the method of using such a wet scrubber 8, may be utilized also for other types of boilers, including boilers combusting a fuel in the presence of ambient air instead if oxygen gas. While using a carbon dioxide containing gas being drawn as part of the process gas generated in the combustion process, as described hereinbefore with reference to FIG. 2, it is also possible to utilize another source of carbon dioxide containing gas. One example of another source of carbon dioxide containing gas is compressed carbon dioxide supplied on truck and supplied to the acidification system 90 via supply duct 132.

To summarize, a wet scrubber 8 for cleaning a process gas containing sulphur dioxide comprises an absorption vessel 40 operative for bringing the process gas into contact with an absorption liquid to absorb sulphur dioxide from the process gas. The wet scrubber 8 further comprises an acidification system 90 operative for mixing absorption liquid that has absorbed sulphur dioxide from the process gas with a carbon dioxide containing gas, an absorbent dissolution tank 54 operative for adding an absorbent material to at least a portion of the absorption liquid, and a return pipe 104 operative for returning to the absorption vessel 40 at least a portion of the absorption liquid that has been mixed with the carbon dioxide containing gas.

While the invention has been described with reference to a number of preferred embodiments, it will be understood by those skilled in the art that various changes may be made and equivalents may be substituted for elements thereof without departing from the scope of the present invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. A method of cleaning a process gas containing sulphur dioxide by a wet scrubber, said method comprising:
   bringing the process gas into contact with an absorption liquid in an absorption vessel to absorb sulphur dioxide from the process gas,
   mixing the absorption liquid with a carbon dioxide containing gas comprising at least 20% by volume carbon dioxide,
   adding an absorbent material to at least a portion of the absorption liquid, and
   returning at least a portion of the absorption liquid to the absorption vessel to absorb more sulphur dioxide from the process gas; and
   mixing the absorption liquid with an oxygen containing gas containing at least 3% by volume oxygen ($O_2$) prior to mixing the absorption liquid with the carbon dioxide containing gas comprising at least 20% by volume carbon dioxide.

2. A method according to claim 1, wherein the mixing the absorption liquid with a carbon dioxide containing gas comprising at least 20% by volume carbon dioxide is carried out simultaneously with the step of adding an absorbent material to at least a portion of the absorption liquid.

3. A method according to claim 1, wherein the mixing the absorption liquid with an oxygen containing gas containing at least 3% by volume oxygen is performed in an oxidation tank from which the absorption liquid is transferred to an absorbent dissolution tank in which the step of mixing the absorption liquid with a carbon dioxide containing gas comprising at least 20% by volume carbon dioxide is carried out.

4. A method according to claim 3, wherein a first portion of the absorbent material is added to the absorbent dissolution tank, and wherein a second portion of the absorbent material is added to the absorption liquid after the absorption liquid has left the absorbent dissolution tank.

5. A method according to claim 1, wherein the carbon dioxide containing gas comprising at least 20% by volume carbon dioxide at least partly originates from process gas that is to be cleaned, or has already been cleaned, in the wet scrubber.

6. A method according to claim 1, wherein at least a portion of the carbon dioxide containing gas comprising at least 20% by volume carbon dioxide is generated in an oxy-fuel boiler.

7. A wet scrubber for cleaning a process gas containing sulphur-dioxide, the wet scrubber comprising:
   an absorption vessel operative for bringing the process gas into contact with an absorption liquid to absorb sulphur dioxide from the process gas,
   an acidification system operative for mixing absorption liquid that has absorbed sulphur dioxide from the process gas with a carbon dioxide containing gas,
   an absorbent dissolution tank operative for adding an absorbent material to at least a portion of the absorption liquid,
   a return pipe operative for returning to the absorption vessel at least a portion of the absorption liquid that has been mixed with the carbon dioxide containing gas, and to which absorption liquid the absorbent material has been added, to absorb more sulphur dioxide from the process gas; and
   an oxidation tank, which is operative for mixing absorption liquid that has absorbed sulphur dioxide from the process gas with an oxygen containing gas containing at least 3% by volume oxygen ($O_2$) the oxidation tank being located upstream of at least one vessel of the acidification system such that the oxidation tank is configured to mix the oxygen containing gas with the absorption liquid prior to the acidification system mixing that absorption liquid with the carbon dioxide containing gas.

8. A wet scrubber according to claim 7, wherein the acidification system is arranged in the absorbent dissolution tank operative for adding an absorbent material to at least a portion of the absorption liquid, such that mixing the absorbent liquid with carbon dioxide containing gas may be performed simultaneously with adding absorbent material to the absorption liquid.

9. A wet scrubber according to claim 7, further comprising a first absorbent supply pipe which is operative for supplying a first portion of the absorbent material to the absorbent dissolution tank, and a further absorbent supply pipe which is operative for supplying a second portion of the absorbent material to the absorption liquid in a position located downstream of the absorbent dissolution tank.

10. A wet scrubber according to claim 7, further comprising a blower configured to direct the oxygen containing gas to the oxidation tank for mixing with the absorption liquid.

11. A wet scrubber according to claim 7, further comprising a gas duct arranged upstream or downstream of the absorption vessel for transporting a portion of the process gas to the acidification system, such that said portion of the process gas will form the carbon dioxide containing gas.

12. A wet scrubber according to claim 11, further comprising a blower arranged for transporting carbon dioxide containing gas via said duct to the acidification system.

13. A wet scrubber according to claim 7, wherein the acidification system comprises at least one nozzle being operative for bubbling the carbon dioxide containing gas through the absorption liquid.

14. A wet scrubber according to claim 7, further comprising a first gas transporting device which is operative for transporting the oxygen containing gas from a first source of gas to the oxidation tank and a second gas transporting device which is operative for transporting the carbon dioxide containing gas from a second source of gas to the acidification system, the first source of gas being different from the second source of gas.

15. A wet scrubber according to claim 7, wherein the oxidation tank has at least one agitator.

16. A wet scrubber according to claim 7, comprising:
an absorbent slurry preparation system being connected to the absorbent dissolution tank for feeding slurry containing the absorbent material to the absorbent dissolution tank.

17. A wet scrubber according to claim 16, wherein the absorbent slurry preparation system comprises a silo configured to store the absorbent material in powder form and an absorbent slurry mixing tank being connected to the silo for receiving the absorbent material from the silo.

18. A wet scrubber according to claim 17, wherein the absorbent slurry preparation system is connected to the absorbent dissolution tank by at least one pipe fluidly connecting the absorbent slurry mixing tank to the absorbent dissolution tank.

19. A wet scrubber according to claim 18, comprising at least one first pH sensor connected to the absorbent dissolution tank.

* * * * *